Jan. 5, 1932.  E. RICARD ET AL  1,839,932
MANUFACTURE OF ANHYDROUS ACETIC ACID
Filed Nov. 14, 1928
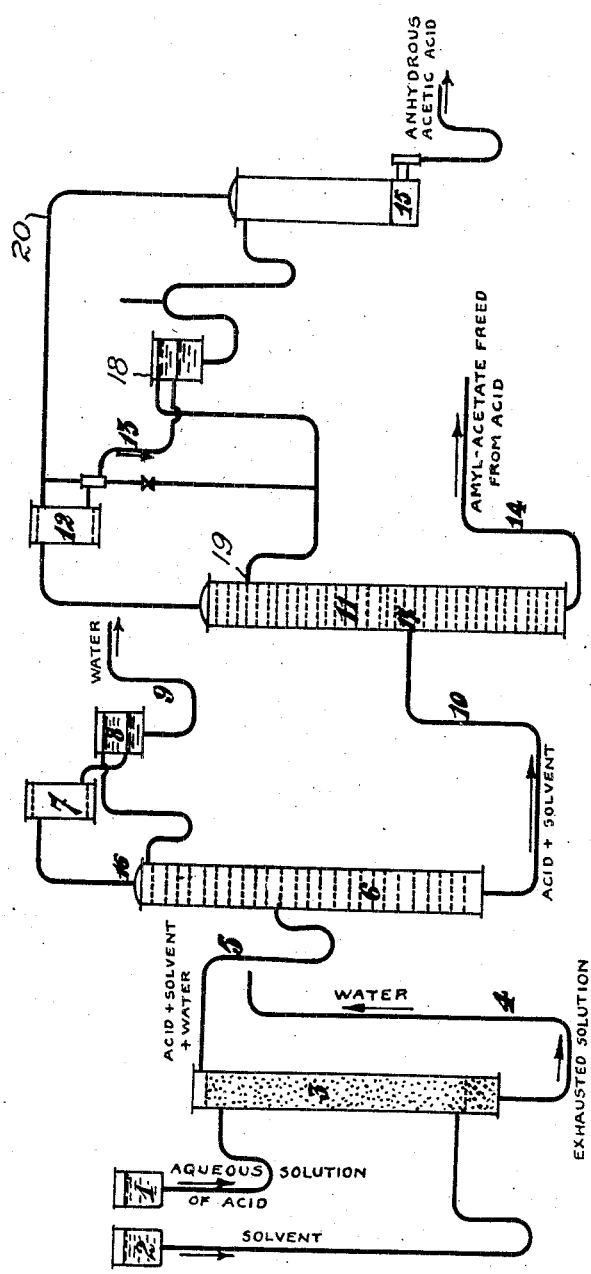

Patented Jan. 5, 1932

1,839,932

UNITED STATES PATENT OFFICE

ELOI RICARD AND HENRI MARTIN GUINOT, OF MELLE, FRANCE, ASSIGNORS TO U. S. INDUSTRIAL ALCOHOL CO., OF NEW YORK, N. Y., A CORPORATION OF WEST VIRGINIA

MANUFACTURE OF ANHYDROUS ACETIC ACID

Application filed November 14, 1928, Serial No. 319,264, and in France August 17, 1928.

This invention relates to the manufacture of concentrated acetic acid from its aqueous solutions, by a process in which the acid is extracted from the aqueous solution by means of a mean-boiling solvent, that is to say a solvent for acetic acid the boiling point of which is above the boiling point of acetic acid but below 150° C. The solvents of this class, of which amyl acetate (boiling point 138° C.–140° C.) is an example, may be single substances or they may be mixtures of two or more liquids, provided that the boiling point of the mixture does not exceed 150° C.

In our prior application Serial No. 243,973, filed December 31, 1927, we have disclosed a process for employing such solvents. Formerly this class of solvents was not employed in manufacture, in spite of the sufficient extracting power which they usually possess, this being due to the defective results obtained when the acid is to be separated from the solvent. After the extraction stage it is desired to remove the acetic acid from its solvent by distillation, but the solvent will be distilled over with the acid, even when the distillation is completed by a thorough rectification with an abundant back-flow, hence requiring the use of a large amount of steam.

In our prior application we disclosed a method whereby the use of mean-boiling solvents is made practical for industrial purposes. The method involved the discovery that it was the presence of a small amount of water in the product of the extraction stage that is to say the mixture or solution of solvent and acid, which caused the difficulty in the then-ensuing separation operation, to overcome which difficulty we subjected the same mixture to a preliminary distillation in the presence of an auxiliary entraining body which formed a minimum boiling point mixture with the water. In consequence of this azeotropic distillation the water was removed at the top of the distilling column in the vapors of this mixture, and the mixture of acetic acid and mean-boiling solvent was obtained at the base of the column in an anhydrous condition, to be supplied to a succeeding distilling column wherein the solvent-acid mixture was then distilled for the purpose of effecting its separation.

The present invention, as herein illustrated, embodies the novelty of our previously disclosed process, and to that extent it constitutes an improvement thereon, but this need not be understood in a limiting sense.

The principal novelty of our new invention is that the dehydrated mixture or solution of the acetic acid and the mean-boiling solvent which extracted the acid from the aqueous solution is distilled after the dehydration in the presence of an auxiliary body which forms a binary mixture of minimum boiling point with the acetic acid, thereby separating the acid from the solvent in the form of a mixture of the acid and the auxiliary body, which mixture can then be easily separated by decanting and distilling. By distilling the mixture of acetic acid and mean-boiling extraction solvent in this manner, the solvent is caused to descend rapidly to the lower part of the distilling column while the acetic acid is carried as an effect of the ebullition to the upper part with the auxiliary liquid used. The result is to make the manufacture of concentrated acetic acid materially more efficient.

The binary mixture of minimum boiling point containing the acid is generally homogeneous. To determine its separation into two layers decantation may be carried out in the presence of a very small proportion of water. The acetic acid passes for the greater part into one of the layers, which is forwarded to a small column where, by moderate ebullition, it is freed from dissolved auxiliary liquid; this distillation at the same time removes the small quantity of added water. There is thus obtained an anhydrous and pure acid at the base of this small column.

The vapours issuing from this small column are conducted directly into the condenser of the rectifying column, in such a manner that the water and the auxiliary liquid are indefinitely circulated in a closed cycle.

With reference to the accompanying drawing, and assuming, for example, that the treatment is applied to a 30 per cent. solution of acetic acid, and that amyl acetate is used as the extracting solvent, the acetic acid solution which is contained in the recipient 1 and the amyl acetate which is employed as a mean-boiling solvent and which is contained in the recipient 2, are circulated on the counter-flow principle in an extracting apparatus 3. As explained in our prior application the extraction of the acid may also be effected by the use of the mean solvents, by acting upon vapors of the dilute acetic acid solution, instead of upon the liquid, in which case a suitable distilling apparatus is used in place of the apparatus 3.

In the apparatus shown in the accompanying drawing, the solution from which the acid has been removed issues through the pipe 4, whilst the mixture of acid and amyl acetate, containing a small amount of water, passes through the pipe 5 and enters the dehydration apparatus 6, provided with surface heating and comprising its accessories, chiefly the condenser 7 and the decanting apparatus 8.

The dehydration is effected by employing ethyl acetate, for example, as the auxiliary entraining liquid in the column 6. It forms with water an azeo-tropic mixture which boils at 70.5° C. This is condensed in the cooling device 7 and separates into two layers in the decanting apparatus 8. The upper layer, containing the ethyl acetate, is sent at 16 into the top of the dehydration apparatus 6, whilst the water issues through the pipe 9.

Many other auxiliary entraining bodies are available and may be employed at this stage in place of the example given, namely ethyl acetate. Further examples, and the boiling points of the azeotropic mixtures which they form with water, include propyl acetate (82.4° C.), isopropyl acetate (75°–76° C.), isobutyl acetate (87.4° C.), isobutyl formate (80.4° C.), ethyl butyrate (88° C.), di-propylether (90° C.), di-isopropylether (62° C.), methyl-isopropylketone (79° C.), di-ethylketone (82.9° C.), and methyl-propylketone (82.9° C.).

The anhydrous mixture of acid and solvent is discharged from the apparatus 6 through the pipe 10 and enters, at 17, a distilling or rectifying column of the ordinary type 11, provided with surface heating and connected with a condenser 12.

In the column 11 we now use a second auxiliary liquid, for example a petrol which boils within very narrow limits, say between 114° C. and 116° C.

This petrol forms with the anhydrous acetic acid a mixture of minimum boiling point containing 45 per cent. of acetic acid and boiling at 100.5° C.

It is easily separated from the amyl acetate as, in the distillation, the latter behaves as a tail product.

The column 11 is charged with a suitable quantity of the petrol. In normal working, the column being heated under working pressure, there is recovered continuously at the lower part of the column amyl acetate which has been freed from acid, and from the upper part of the binary azeotropic mixture acid-petrol, which is condensed in the condenser 12. This latter mixture is homogeneous but separates into two layers in the decantation apparatus 18 in the presence of an extremely small quantity of water, for example 1 per cent., which is added in the decantation apparatus, or elsewhere (not in the rectifier 11). The lower layer consists of the acid, amounting to some 900 grams per litre, containing in solution about 10 per cent. of petrol; it is forwarded to a small column 15 containing heating surfaces, and from the bottom of this column pure anhydrous acid is recovered. The upper layer, rich in petrol, is returned continuously, at 19, to column 11.

The vapors which pass from the top of the small column 15 are conducted by pipe 20 directly to the condenser 12 of the rectifying column 11, so that the water is circulated in a closed cycle between the decantation apparatus 18, the small column 15 and the condenser 12.

It is obvious that the invention is not dependent upon the particular mean-boiling extraction solvent used, or upon the particular auxiliary liquid or entraining body employed in the rectifying column 11 to effect the separation of the acetic acid from the solvent. Amyl acetate has been mentioned as solvent, and petrol as the second auxiliary liquid. Other mean-boiling solvents are referred to in our prior application. For further specific examples we may mention butyl acetate as solvent and methyl-cyclohexane as the second auxiliary body, or ketones, for instance butyrone, as solvent and toluene as the second auxiliary body. The examples could be multiplied. In general, the second auxiliary liquid should be one which forms with acetic acid a mixture having a minimum boiling point, but which does not form an azeotropic mixture with the extraction solvent; or if it would form an azeotropic mixture with the solvent, such mixture should have a boiling point considerably higher than the azeotropic mixture of acetic acid and second auxiliary body so as to permit an easy separation.

Having thus fully described the nature of the said invention and the best means we know of carrying the same into practicable effect, we claim:—

1. In the process of obtaining concentrated acetic acid from aqueous solutions thereof, the steps which comprise extracting the acetic acid from the acqueous solution by means of a solvent whose boiling point exceeds that of acetic acid but is below 150° C., then dehydrating the resulting mixture of solvent and acetic acid by distillation in the presence of an auxiliary entraining liquid which forms with water a minimum boiling point mixture, drawing off the dehydrated mixture of acetic acid and solvent, and then distilling the dehydrated mixture of acetic acid and solvent in the presence of a second auxiliary liquid which forms with the acid a binary mixture of minimum boiling point.

2. Process of obtaining concentrated acetic acid from aqueous solutions thereof, which comprises the steps of extracting the acetic acid from the aqueous solution by means of a solvent whose boiling point exceeds that of acetic acid but is below 150° C., then dehydrating the resulting mixture of solvent and acetic acid by distillation in the presence of an auxiliary entraining liquid which forms with water a minimum boiling point mixture, drawing off the dehydrated mixture of acetic acid and solvent, then distilling the dehydrated mixture of acetic acid and solvent in the presence of a second auxiliary liquid which forms with the acid a binary mixture of minimum boiling point, and finally removing the acetic acid from said binary mixture.

3. In the process of obtaining concentrated acetic acid from aqueous solutions thereof, the steps which comprise extracting the acetic acid from the aqueous solution by means of a solvent whose boiling point exceeds that of acetic acid but is below 150° C., then dehydrating the resulting mixture of solvent and acetic acid by distillation in the presence of an auxiliary entraining liquid which forms with water a minimum boiling point mixture, drawing off the dehydrated mixture of acetic acid and solvent, then distilling the dehydrated mixture of acetic acid and solvent in the presence of a second auxiliary liquid which forms with the acid a binary mixture of minimum boiling point, withdrawing from the upper part of the zone in which the last mentioned distillation is conducted the binary mixture containing the acetic acid and from the lower part the solvent which has been freed from acid.

4. In the process of obtaining concentrated acetic acid from aqueous solutions thereof, the steps which comprise extracting the acetic acid from the aqueous solution by means of a solvent whose boiling point exceeds that of acetic acid but is below 150° C., then dehydrating the resulting mixture of solvent and acetic acid by distillation in the presence of an auxiliary entraining liquid which forms with water a minimum boiling point mixture, drawing off the dehydrated mixture of acetic acid and solvent, then distilling the dehydrated mixture of acetic acid and solvent in the presence of a second auxiliary liquid which forms with the acid a binary mixture of minimum boiling point, condensing the binary mixture of acetic acid and the second auxiliary liquid and causing the same to separate into two layers in the presence of a small proportion of water.

5. Process of obtaining concentrated acetic acid from aqueous solutions thereof, which comprises the steps of extracting the acetic acid from the aqueous solution by means of a solvent whose boiling point exceeds that of acetic acid but is below 150° C., then dehydrating the resulting mixture of solvent and acetic acid by distillation in the presence of an auxiliary entraining liquid which forms with water a minimum boiling point mixture, drawing off the dehydrated mixture of acetic acid and solvent, then distilling the dehydrated mixture of acetic acid and solvent in the presence of a second auxiliary liquid which forms with the acid a binary mixture of minimum boiling point, condensing the binary mixture of acetic acid and the second auxiliary liquid and causing the same to separate into two layers in the presence of a small proportion of water, returning the layer rich in the second auxiliary liquid to the distillation zone where the dehydrated mixture of acetic acid and solvent is distilled, and forwarding the layer rich in acetic acid to another distilling zone from the bottom of which the acetic acid is recovered.

6. In the process set forth in claim 5, the further step of returning condensed vapor from the last-mentioned distilling zone to the said decanting zone, whereby the small quantity of water necessary to procure the decantation is indefinitely circulated in a closed cycle.

7. In a method of obtaining concentrated anhydrous acetic acid from an aqueous solution, the steps which comprise extracting the acid from the aqueous solution by means of a solvent, dehydrating the resulting mixture of acetic acid and extraction solvent, distilling the dehydrated mixture in the presence of an auxiliary liquid which forms with the acetic acid a mixture of minimum boiling point, thereby separating the acid from the extraction solvent, effecting the separation of the mixture of acetic acid and said auxiliary liquid into layers by the aid of a small quantity of water in order to obtain a layer rich in acetic acid, forwarding this layer to a distilling zone from the bottom of which the substantially pure acetic acid is withdrawn, and returning the vapors issuing from the top of this apparatus to the stage of the process in which the mixture of acid and said auxiliary liquid is separated into layers, whereby the small quantity of water employed to procure the decantation is circulated in a closed cycle.

In testimony whereof we have signed this specification.

ELOI RICARD.
HENRI MARTIN GUINOT.